US011264796B2

(12) United States Patent
Minami

(10) Patent No.: US 11,264,796 B2
(45) Date of Patent: Mar. 1, 2022

(54) TECHNIQUE TO PROTECT CIRCUIT FROM SURGE VOLTAGE

(71) Applicant: CANON KABUSHIKI KAISHA, Tokyo (JP)

(72) Inventor: Yutaro Minami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 16/909,659

(22) Filed: Jun. 23, 2020

(65) Prior Publication Data

US 2021/0006065 A1 Jan. 7, 2021

(30) Foreign Application Priority Data

Jul. 4, 2019 (JP) .............................. JP2019-125464

(51) Int. Cl.
*H02H 9/04* (2006.01)
*G08B 21/18* (2006.01)
*H02H 1/00* (2006.01)

(52) U.S. Cl.
CPC ........... *H02H 9/042* (2013.01); *G08B 21/185* (2013.01); *H02H 1/0007* (2013.01); *H02H 1/0092* (2013.01)

(58) Field of Classification Search
CPC ........ H02H 9/042; H02H 9/043; H02H 9/046; H02H 9/04; H02H 1/0007; H02H 1/0092; G08B 21/185
See application file for complete search history.

(56) References Cited

U.S. PATENT DOCUMENTS

| 6,034,611 | A | * | 3/2000 | Brooks | ................. | G01R 31/52 340/647 |
| 2010/0149702 | A1 | * | 6/2010 | Su | .......................... | H02H 9/005 361/56 |
| 2020/0389015 | A1 | * | 12/2020 | Johnson | ................... | H02H 9/04 |

FOREIGN PATENT DOCUMENTS

JP 2000-156930 6/2000

OTHER PUBLICATIONS

U.S. Appl. No. 16/983,013, filed Aug. 3, 2020 by Yutaro Minami.

* cited by examiner

*Primary Examiner* — Nguyen Tran
(74) *Attorney, Agent, or Firm* — Venable LLP

(57) ABSTRACT

A first surge absorber has a low resistance when a surge voltage which is greater than or equal to a first operating voltage is applied to a power supply line, and has a high resistance when the surge voltage which is greater than or equal to the first operating voltage is not applied. A detector outputs a detection signal indicating that the surge voltage is greater than or equal to the first operating voltage when the surge voltage is greater than or equal to the first operating voltage. A second surge absorber becomes a low resistance when a surge voltage greater than or equal to a second operating voltage is applied, and becomes a high resistance when a surge voltage greater than or equal to the second operating voltage is not applied.

19 Claims, 10 Drawing Sheets

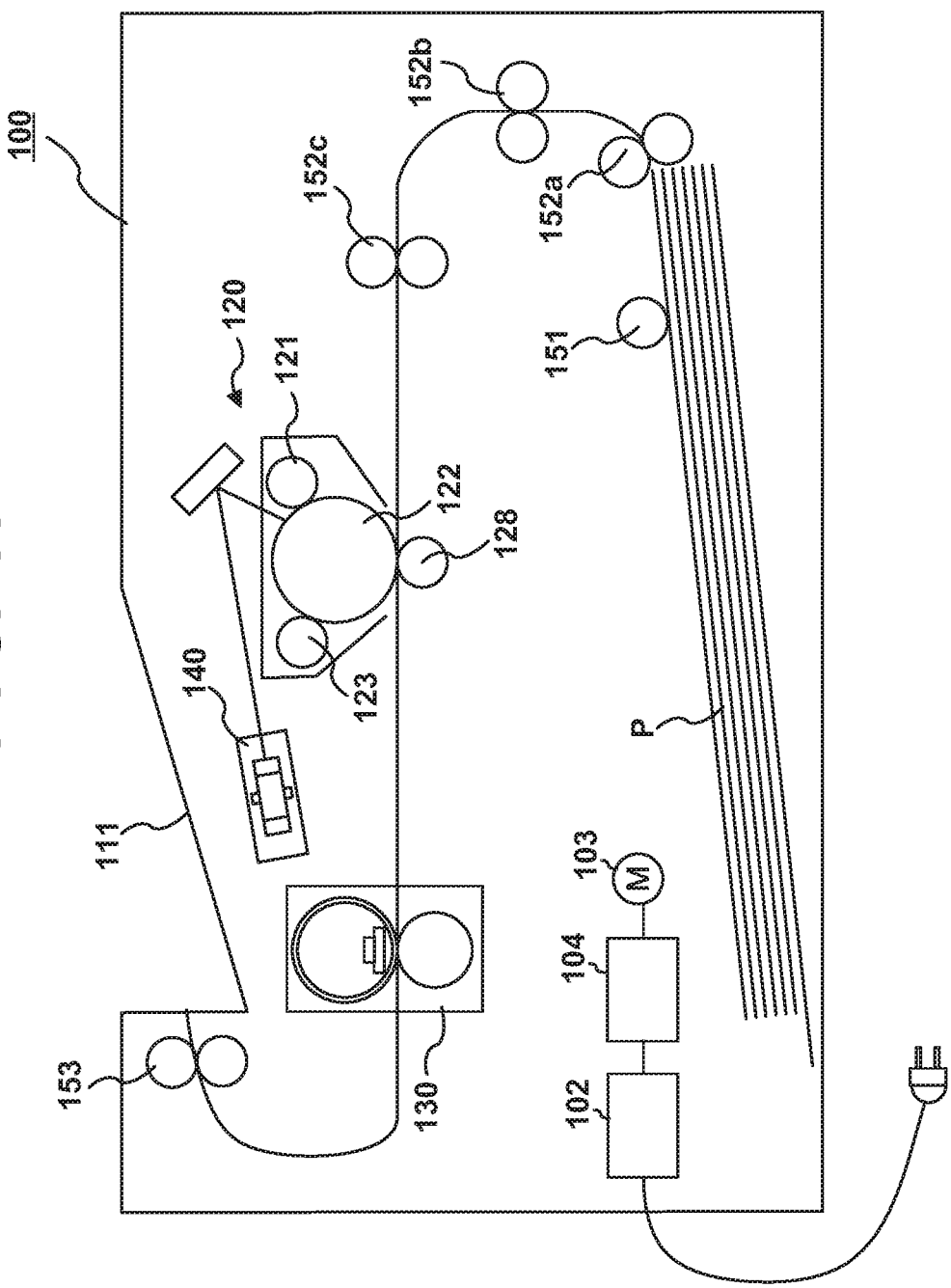

TECHNIQUE TO PROTECT CIRCUIT FROM SURGE VOLTAGE

BACKGROUND OF THE INVENTION

Field of the Invention

The present invention relates to a technique for protecting a circuit from a surge voltage.

Description of the Related Art

There are case where an external surge (a lightning surge due to a direct lightning strike or an indirect lightning strike, a switching surge that occurs due to a circuit switching operation of a circuit breaker, or a surge that occurs due to electrostatic induction or electromagnetic induction) is applied to a power supply apparatus. According to Japanese Patent Laid-Open No. 2000-156930, protecting a power supply circuit by inserting a surge protection device between two power supply lines is proposed. In addition, in Japanese Patent Laid-Open No. 2000-156930, connecting an optical coupling device in series with a surge protection device, and measuring a time when a surge is applied and the duration of the surge have been proposed.

When a surge voltage equal to or greater than a predetermined operating voltage is applied to the surge protection device (surge absorbing element), the resistance value of the surge protection device is lowered, a surge current flows through the optical coupling element, and the surge is detected. Therefore, the prior art could not detect a surge voltage lower than the operating voltage of the surge protection device. On the other hand, it has been found that surge voltages which are smaller than large surge voltages which have been of interest in the prior art occur. If a small surge voltage only occurs once, a circuit element that configures a power supply circuit will not be destroyed, but when small surge voltages occur many times, there are cases where the circuit element will be destroyed. Therefore, the present invention aims to detect small surge voltages while protecting a power supply circuit from large surge voltages.

SUMMARY OF THE INVENTION

The present invention provides a power supply apparatus comprising the following elements. A power supply circuit is connectable to a power supply line from an AC power supply. A protection circuit is configured to protect the power supply circuit by reducing a surge voltage applied to the power supply line. The first detection circuit that is connected in parallel to the protection circuit and is configured to detect the surge voltage. The first detection circuit may have a first surge absorbing circuit configured to become a low resistance in a case where the surge voltage which is greater than or equal to a first operating voltage is applied to the power supply line, and become a high resistance in a case where the surge voltage which is greater than or equal to the first operating voltage is not applied to the power supply line, and a detection circuit configured to output a detection signal indicating that the surge voltage detected by the first detection circuit is greater than or equal to the first operating voltage in a case where the surge voltage is greater than or equal to the first operating voltage. The protection circuit may have a second surge absorbing circuit configured to become a low resistance in a case where a surge voltage greater than or equal to a second operating voltage which is larger than the first operating voltage is applied to the power supply line, and become a high resistance in a case where a surge voltage greater than or equal to the second operating voltage is not applied to the power supply line.

Further features of the present invention will become apparent from the following description of exemplary embodiments (with reference to the attached drawings).

BRIEF DESCRIPTION OF THE DRAWINGS

FIG. 11 is a view showing an example of an electronic device.

DESCRIPTION OF THE EMBODIMENTS

Figure 1:
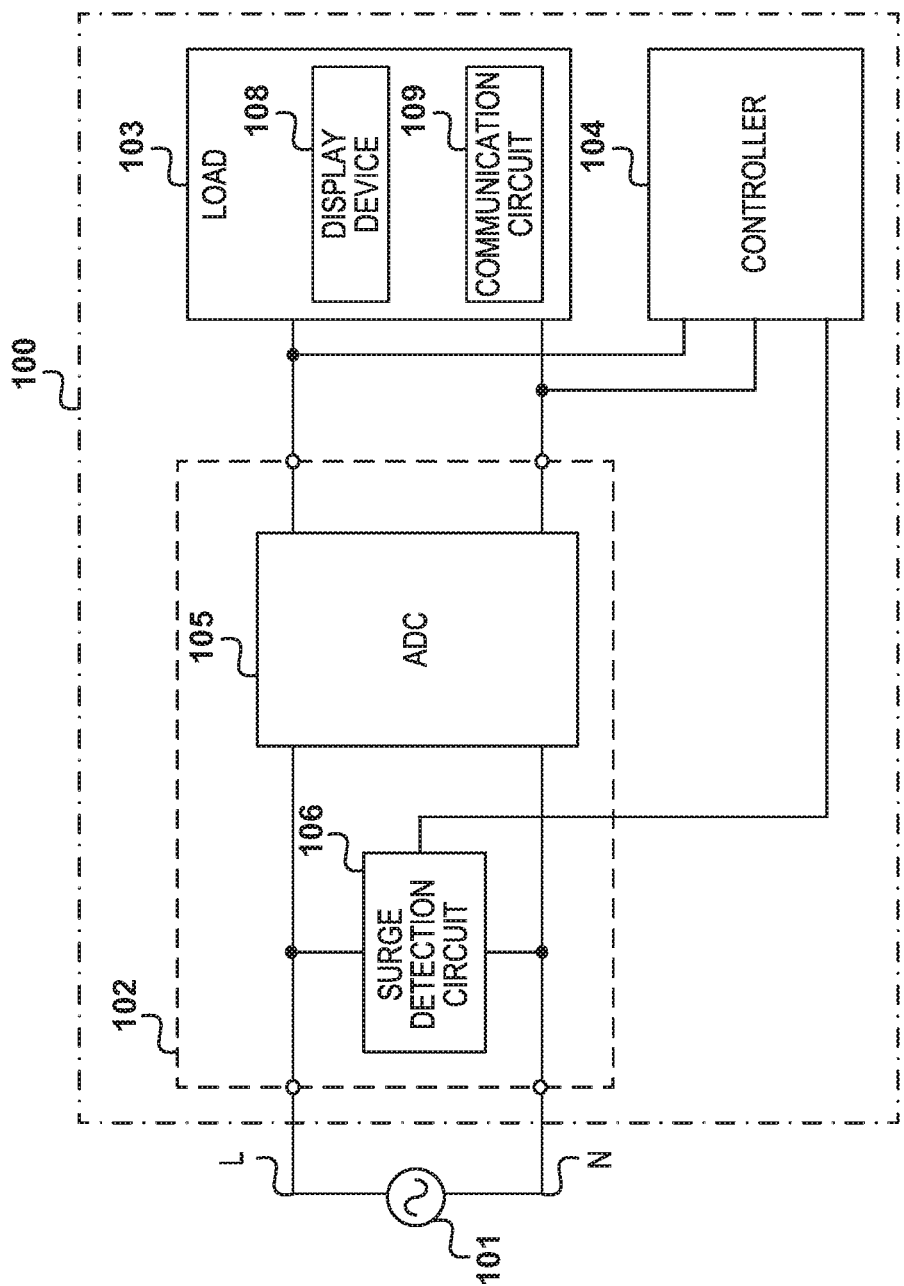
FIG. 1 is a view illustrating an electronic device.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

<Electronic Device and Power Supply Apparatus>

FIG. 1 shows an electronic device 100 connected to a commercial power supply 101. The electronic device 100 is, for example, an image forming apparatus. The electronic device 100 operates based on an alternating current supplied from the commercial power supply 101. The electronic device 100 has two power supply lines connected to the commercial power supply 101, one of which is referred to as a live line L, and the other is referred to as a neutral line N. An ADC 105 is a power supply circuit that converts an alternating current supplied from the commercial power supply 101 to generate a direct current. ADC is an abbreviation of AC/DC converter. A load 103 operates by being supplied with a direct current from the ADC 105. The load 103 may be, for example, a motor, a high-voltage generator, a display device 108, or a communication circuit 109 that are in an image forming engine. A controller 104 also operates by being supplied with a direct current from the ADC 105, and controls the load 103.

A power supply apparatus 102 has a surge detection circuit 106 in addition to the ADC 105. The surge detection circuit 106 is connected between the live line L and the neutral line N, and detects a surge voltage applied to the live line L and the neutral line N. The surge detection circuit 106 outputs a detection signal to the controller 104 upon detection of a surge voltage. The controller 104 is configured by at least one processor and determines that a surge voltage has occurred based on the detection signal.

<Surge Detection Circuit>

Figure 2:
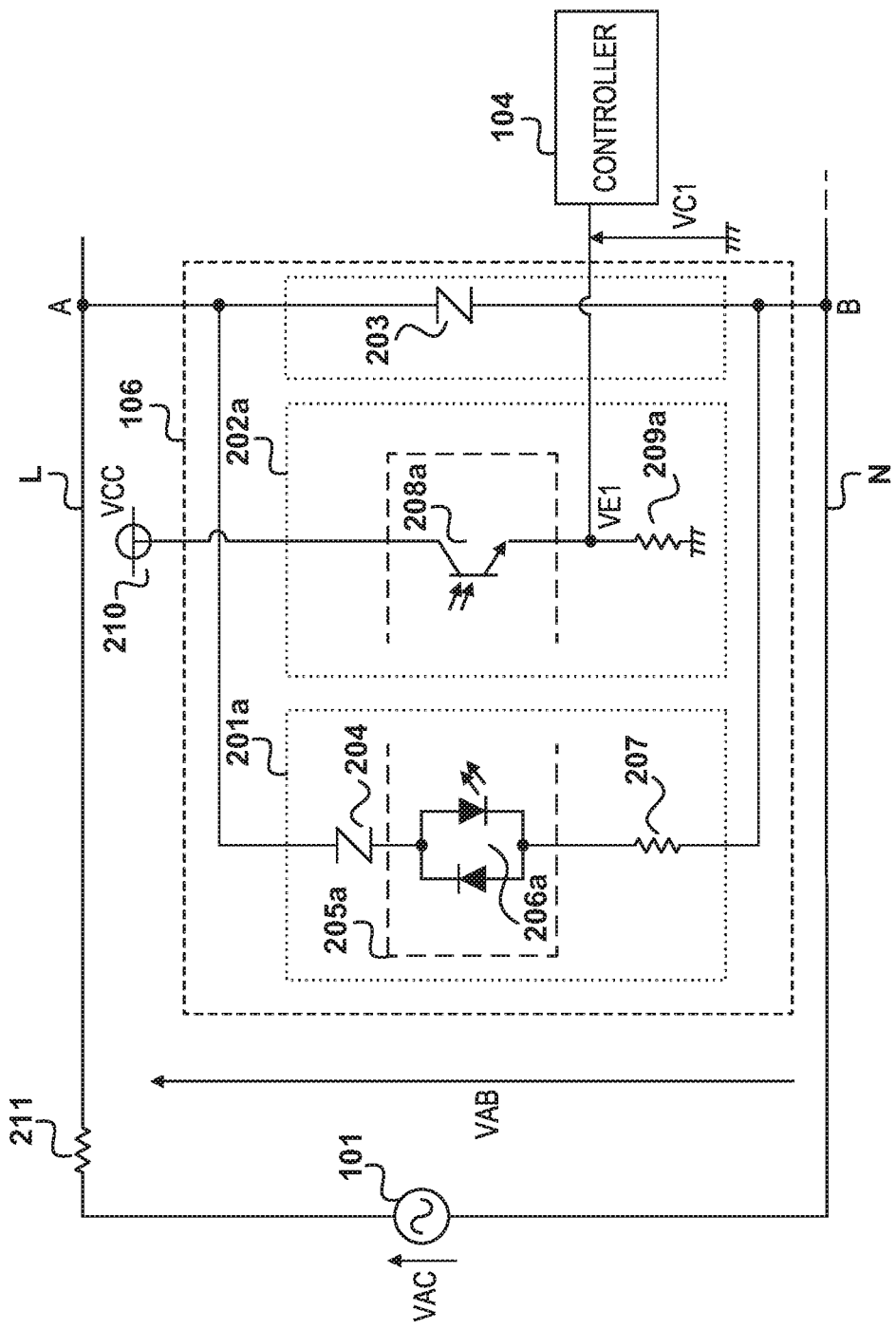
FIG. 2 is a circuit diagram showing a surge detection apparatus.

FIG. 2 is a circuit diagram showing a surge detection apparatus. According to FIG. 2, the surge detection circuit 106 includes a surge detection circuit 201a, a surge reporting circuit 202a, and a surge protection circuit (surge absorbing element 203). The surge detection circuit 201a is connected between the live line L and the neutral line N. The surge detection circuit 201a includes a surge absorbing element 204, a light emitting unit 206a of a photocoupler 205a, and a resistor 207 which are each connected in series. The photocoupler 205a is an optical coupling element for insulating a primary side and a secondary side. The light emitting unit 206a has two light emitting elements (e.g., light emitting diodes). The two light emitting elements are connected in inverse parallel. That is, the cathode of the second light emitting element is connected to the anode of the first light emitting element, and, the cathode of the first light emitting element is connected to the anode of the second light emitting element. Thus, without depending on the polarity of a surge voltage, the light emitting unit 206a emits light in accordance with the surge voltage. Incidentally, the connection order of the surge absorbing element 204, the light emitting unit 206a, and the resistor 207 may be any order.

The surge absorbing element 204 is an element for which its resistance value R becomes a low resistance in a case where a surge voltage applied between the live line L and the neutral line N is greater than or equal to a first operating voltage V1, and the resistance value R becomes a high resistance in a case where a surge voltage applied between the live line L and the neutral line N is less than the first operating voltage V1. It is sufficient if the surge absorbing element 204 is an element that can suppress a surge voltage, such as a varistor, a Zener diode, or a gas discharge tube. Here, the first operating voltage V1 is the peak value of the voltage that occurs between the two terminals of the surge absorbing element 204 when a standard surge current flows into the surge absorbing element 204. The first operating voltage V1 may be referred to as a clamp voltage or a limiting voltage.

The resistor 207 is for, when the resistance value of the surge absorbing element 204 is lowered, limiting current flowing through the surge absorbing element 204 and the light emitting unit 206a. The withstand voltage of the resistor 207 is higher than the withstand voltage of the surge absorbing element 204 and the light emitting unit 206a, and its resistance value is selected so that most of the surge voltage is applied to the resistor 207.

In this embodiment, the light emitting unit 206a has two light emitting elements which are connected in inverse parallel. However, the light emitting unit 206a may be formed by an inverse parallel connection of two photocouplers having one light emitting element.

The surge reporting circuit 202a has a light receiving unit 208a of the photocoupler 205a and a resistor 209a which are connected in series. The resistor 209a functions as a pull-down resistor. The surge reporting circuit 202a operates by being supplied with power from an external power supply 210. As the light receiving unit 208a, for example, it is possible to employ a phototransistor, a triac, or a MOSFET. In the present embodiment, description is given for the light receiving unit 208a assuming that a phototransistor is employed as the light receiving unit 208a. The external power supply 210 is connected to the collector of the light receiving unit 208a. One end of the resistor 209a is connected to the emitter of the light receiving unit 208a. The other end of the resistor 209a is connected to earth. The emitter of the light receiving unit 208a is connected to an input port of the controller 104, and outputs a surge detection signal VE1 to the controller 104. When the level of the surge detection signal VE1 is High (voltage VCC of the external power supply 210), the controller 104 determines that a surge voltage has been applied between the two power supply lines. In the present embodiment, the photocoupler 205a may be replaced with a current transformer. In this case, the light emitting unit 206a is replaced with the primary side of the current transformer, and the light receiving unit 208a is replaced with the secondary side of the current transformer. That is, it is sufficient if, in the surge detection circuit 106, a state where a portion where the AC voltage from the commercial power supply 101 is applied is insulated from the controller 104 is entered.

The surge absorbing element 203 is connected between the live line L and the neutral line N. The surge absorbing element 203 is an element for which its resistance value becomes low in a case where a surge voltage applied between the live line L and the neutral line N is greater than or equal to a second operating voltage V2, and the resistance value becomes high in a case where a surge voltage applied between the live line L and the neutral line N is less than the second operating voltage V1. It is sufficient if the surge absorbing element 203 is an element that can suppress a surge voltage, such as a varistor, a Zener diode, or a gas discharge tube. The second operating voltage V2 of the surge absorbing element 203 is higher than the first operating voltage V1 of the surge absorbing element 204. The surge absorbing element 203 is provided to protect the power supply circuit from a relatively large surge voltage. The surge absorbing element 204 is provided to detect a relatively small surge voltage. Here, the second operating voltage V2 is the peak value of a voltage that occurs between the two terminals of the surge absorbing element 203 when a standard surge current flows into the surge absorbing element 203. The second operating voltage V2 may be referred to as a clamp voltage or a limiting voltage.

In FIG. 2, a connection point between the surge detection circuit 106 and the live line L is A. The connection point between the surge detection circuit 106 and the neutral line N is B. Hereinafter, a line impedance 211 present between the commercial power supply 101 and the surge detection circuit 106 is considered.

<Operation of Surge Detection Apparatus>

Figure 3A:
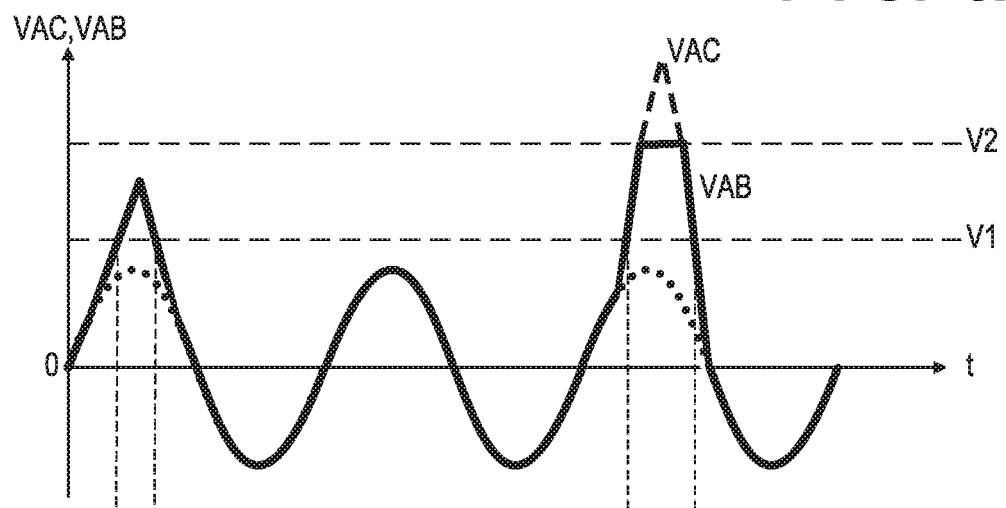
FIG. 3A and FIG. 3B are views for describing surge voltages and detection signals.
Figure 3B:
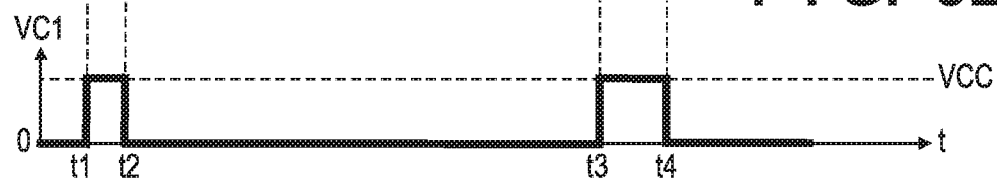

FIG. 3A shows the variation of a voltage VAC of the commercial power supply 101. The vertical axis indicates the voltage. The horizontal axis represents time. The end-to-end voltage across the surge detection circuit 106 is VAB. The dotted line indicates the waveform of the voltage VAC when no surge voltage is occurring. FIG. 3B shows a voltage VC1 applied to an input port of the controller 104. The vertical axis indicates voltage. The horizontal axis indicates time. Hereinafter, the operation of the surge detection circuit 106 will be described for each of a first time period ($0<t<t1$), a second time period ($t1 \le t \le t2$), a third time period ($t2<t<t3$), and a fourth time period ($t3 \le t \le t4$).

First Time Period [$0<t<t1$]

In the first time period, no surge voltage has occurred. Therefore, the voltage VAC of the commercial power supply 101 does not exceed the first operating voltage V1 of the surge absorbing element 204 or the second operating voltage V2 of the surge absorbing element 203. Since the voltage VAC does not exceed the first operating voltage V1 of the surge absorbing element 204, the resistance value of the surge absorbing element 204 is a high resistance value. Therefore, a surge current does not flow to the light emitting unit 206a of the photocoupler 205a, and the light receiving unit 208a of the photocoupler 205a is turned off. As a result, the voltage VC1 applied to the input port of the controller is pulled down by the resistor 209a to 0 [V].

In the first time period, the voltage VAC does not exceed the second operating voltage V2 of the surge absorbing element 203. Therefore, the resistance value of the surge absorbing element 203 is a high resistance value, and a surge current ISURGE does not flow to the surge absorbing element 203. Therefore, a voltage drop at the line impedance 211 is minute. Ignoring this voltage drop, the end-to-end voltage VAB across the surge detection circuit 106 is equal to the voltage VAC.

Second Time Period [t1≤t≤t2]

In the second time period, an external surge is applied to the commercial power supply 101. Therefore, the voltage VAC of the commercial power supply 101 becomes greater than or equal to the first operating voltage V1 of the surge absorbing element 204 and less than the second operating voltage V2 of the surge absorbing element 203. That is, the surge voltage is greater than or equal to the first operating voltage V1, and is less than the second operating voltage V.

When the voltage VAC becomes greater than or equal to the first operating voltage V1 of the surge absorbing element 204, the resistance value of the surge absorbing element 204 becomes a low resistance value. Therefore, a surge current flows through the commercial power supply 101, the line impedance 211, and the surge detection circuit 201a.

By the resistance value of the surge absorbing element 204 becoming a low resistance value, a current flows through the light emitting unit 206a, and the light emitting unit 206a outputs light. When the light receiving unit 208a receives this light, the light receiving unit 208a is turned on. When the light receiving unit 208a is turned on, the level of the surge detection signal VE1 becomes High. When the level of the surge detection signal VE1 becomes High, the controller 104 recognizes that an external surge is applied to the commercial power supply 101, and the voltage VAC has become greater than or equal to the first operating voltage V1.

When the resistance value of the surge absorbing element 204 becomes a low resistance value, the resistor 207 receives most of the surge voltage. Therefore, in the second time period, the end-to-end voltage VAB across the surge detection circuit 106 does not become the second operating voltage V2 of the surge absorbing element 203. A resistance value 207 of the resistor 207 is designed so as not to exceed a rated current IRATED of the light emitting unit 206a when an external surge is applied to the commercial power supply 101. Therefore, the resistance value R207 is decided so as to satisfy the following equation.

$$R207 > (V2-V1)/\text{IRATED} \quad (1)$$

In Equation (1), the voltage drop due to the forward voltage of the light emitting unit 206a of the photocoupler 205a, as compared with the first operating voltage V1 of the surge absorbing element 204, is small enough to be negligible. Therefore, the component of the voltage drop caused by the light emitting unit 206a is excluded from Equation (1).

In the second time period, the voltage VAC of the commercial power supply 101 does not exceed the second operating voltage V2 of the surge absorbing element 203. Therefore, the operation of the surge absorbing element 204 in the second time period is similar to that in the first time period.

Third Time Period [t2<t<t3]

In the third time period, the voltage VAC of the commercial power supply 101 does not exceed the first operating voltage V1 of the surge absorbing element 204 or the second operating voltage V2 of the surge absorbing element 203. In other words, the third time period is where a surge voltage does not occur. Therefore, the operation of the surge detection circuit 106 in the third time period is similar to the operation of the surge detection circuit 106 in the first time period.

Fourth Time Period [t3≤t≤t4]

In the fourth time period, since an external surge is applied to the commercial power supply 101, the voltage VAC of the commercial power supply 101 becomes greater than the first operating voltage V1 of the surge absorbing element 204 and greater than or equal to the second operating voltage V2 of the surge absorbing element 203. That is, a surge voltage larger than the first operating voltage V1 and the second operating voltage V2 is applied to the surge detection circuit 106.

In the fourth time period, the voltage VAC of the commercial power supply 101 exceeds the first operating voltage V1 of the surge absorbing element 204. The operation of the surge detection circuit 201a and the surge reporting circuit 202a are similar to that in the second time period. The fourth time period includes a time period where the voltage VAC of the commercial power supply 101 exceeds the second operating voltage V2 of the surge absorbing element 203. In this time period, the surge absorbing element 203 absorbs the surge voltage, and the voltage applied to the surge absorbing element 203 is clamped at the second operating voltage V2. Therefore, the end-to-end voltage VAB becomes equal to the second operating voltage V2.

The resistance value of the surge absorbing element 203 becomes a low resistance value. Therefore, a surge current ISURGE flows through a route formed by the commercial power supply 101, the line impedance 211, and the surge absorbing element 203. Letting the resistance value of the line impedance 211 be R, the following equation holds.

$$VAB = V2 = VAC - R \times \text{ISURGE} \quad (2)$$

By surge absorbing element 203 operating, the end-to-end voltage VAB of the surge detection circuit 106 is limited to the second operating voltage V2 of the surge absorbing element 203. As a result, a power supply circuit (the ADC 105) located subsequent to the surge detection circuit 106 is protected from an external surge.

In the present embodiment, while protecting the power supply circuit from a surge voltage that is greater than or equal to the second operating voltage V2, it becomes possible to detect a surge voltage that is greater than or equal to the first operating voltage V1 and less than the second operating voltage V2. Here, when even a small surge voltage is repeatedly applied, there is a possibility that the power supply circuit will fail. Therefore, if a warning can be output in advance when even a small surge voltage repeatedly occurs, it will be possible to replace the power supply circuit before the power supply circuit fails. In other words, downtime of the electronic device 100 due to a failure of the power supply circuit will be reduced. Downtime is time where a user cannot use the electronic device 100. Here, a number of times X that the voltage VAC of the commercial power supply 101 becomes greater than or equal to the first operating voltage V1 of the surge absorbing element 204 is counted. The controller 104 has a non-volatile memory and may hold the number of times X in the non-volatile memory.

Figure 4A:
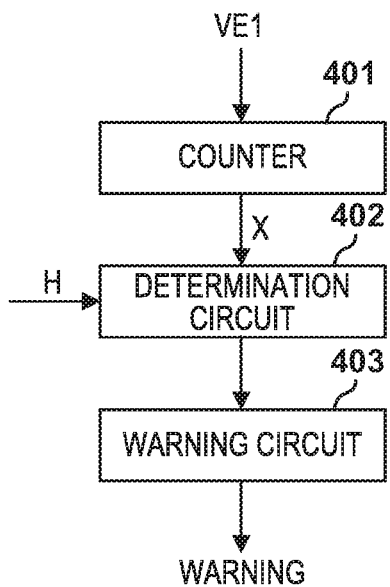
FIG. 4A and FIG. 4B are views for describing a controller.

FIG. 4A illustrates functions that the controller 104 has. A counter 401 is a coefficient circuit for counting the number of times X the level of the surge detection signal VE1 becomes High. A determination circuit 402 is for determining whether the number of times X is equal to or greater than a threshold H. For example, if the number of times X is less than the threshold H, the determination circuit 402 outputs a low-level determination signal to a warning circuit 403. If the number of times X is greater than or equal to the threshold H, the determination circuit 402 outputs a high-level determination signal to a warning circuit 403. The warning circuit 403 outputs a warning when the number of times X is equal to or greater than the threshold H to the display device 108 or the communication circuit 109. The display device 108 displays a predetermined warning message. The communication circuit 109 expresses a warning message to a predetermined network address. The predetermined network address may be, for example, an email address of an administrator who manages the electronic device 100 or an email address of a company in charge of maintenance of the electronic device 100.

Figure 4B:
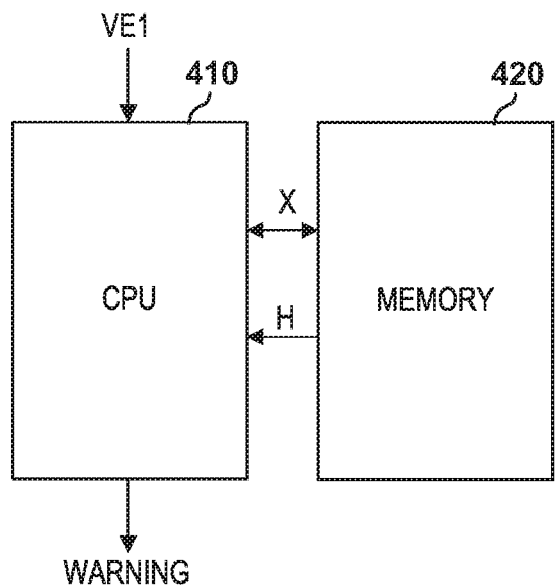

FIG. 4B illustrates an exemplary implementation of functions of the controller 104 by processor circuitry. A CPU 410 executes control programs stored in a memory 420 to function as the counter 401, the determination circuit 402, and the warning circuit 403. The memory 420 stores the number of times X and the threshold H. The memory 420 includes a ROM region for storing a control program, a RAM region for storing a variable, and the like.

<Flow Chart>

Figure 5:
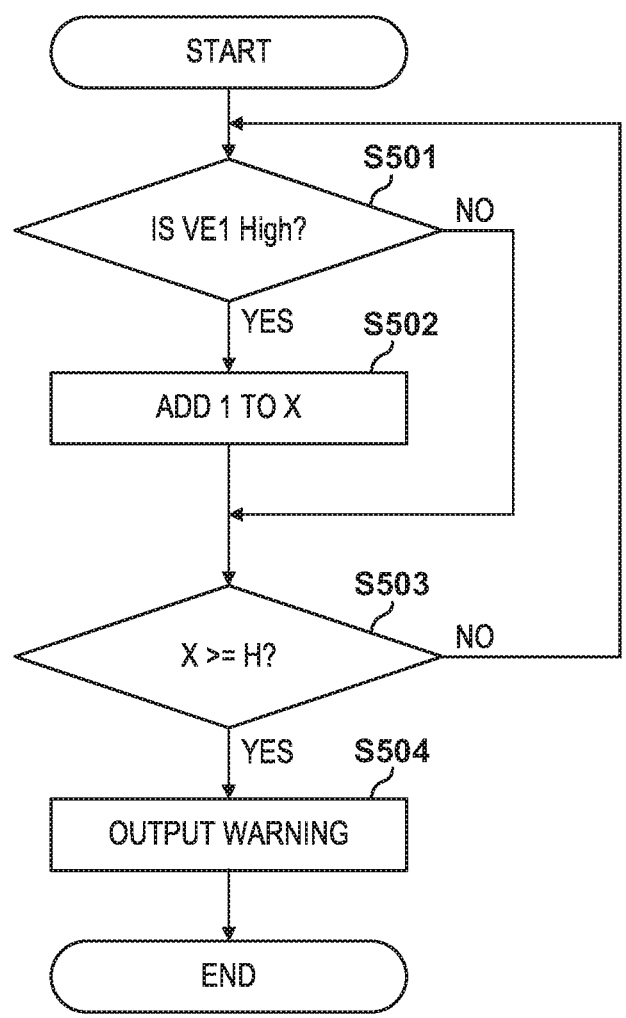
FIG. 5 is a flowchart for illustrating a surge detection method.

FIG. 5 is a flow chart showing a control method executed by the CPU 410 of the controller 104.

In step S501, the CPU 410 determines whether the level of the surge detection signal VE1 is High. If the level of the surge detection signal VE1 is High, the CPU 410 advances the processing to step S502. If the level of the surge detection signal VE1 is not High, the CPU 410 advances the processing to step S503.

In step S502, the CPU 410 adds 1 to the number of times X held in the memory 420.

In step S503, the CPU 410 determines whether the number of times X is greater than or equal to the threshold H. The threshold H is the number of times at which the replacement of the power supply circuit is recommended, and is obtained in advance by simulation or experiment. If the number of times X is greater than or equal to the threshold H, the CPU 410 advances the processing to step S504. If the number of times X is less than the threshold H, the CPU 410 advances the processing to step S501.

In step S504, the CPU 410 outputs a warning. For example, the CPU 410 may cause the display device 108 to display a warning message. The CPU 410 may control the communication circuit 109 to cause a warning message to be transmitted to a predetermined network address. The warning message includes a message that prompts replacement of the power supply apparatus 102. When the power supply apparatus 102 is replaced, the value of the number of times X is initialized to 0.

Second Embodiment

Figure 6:
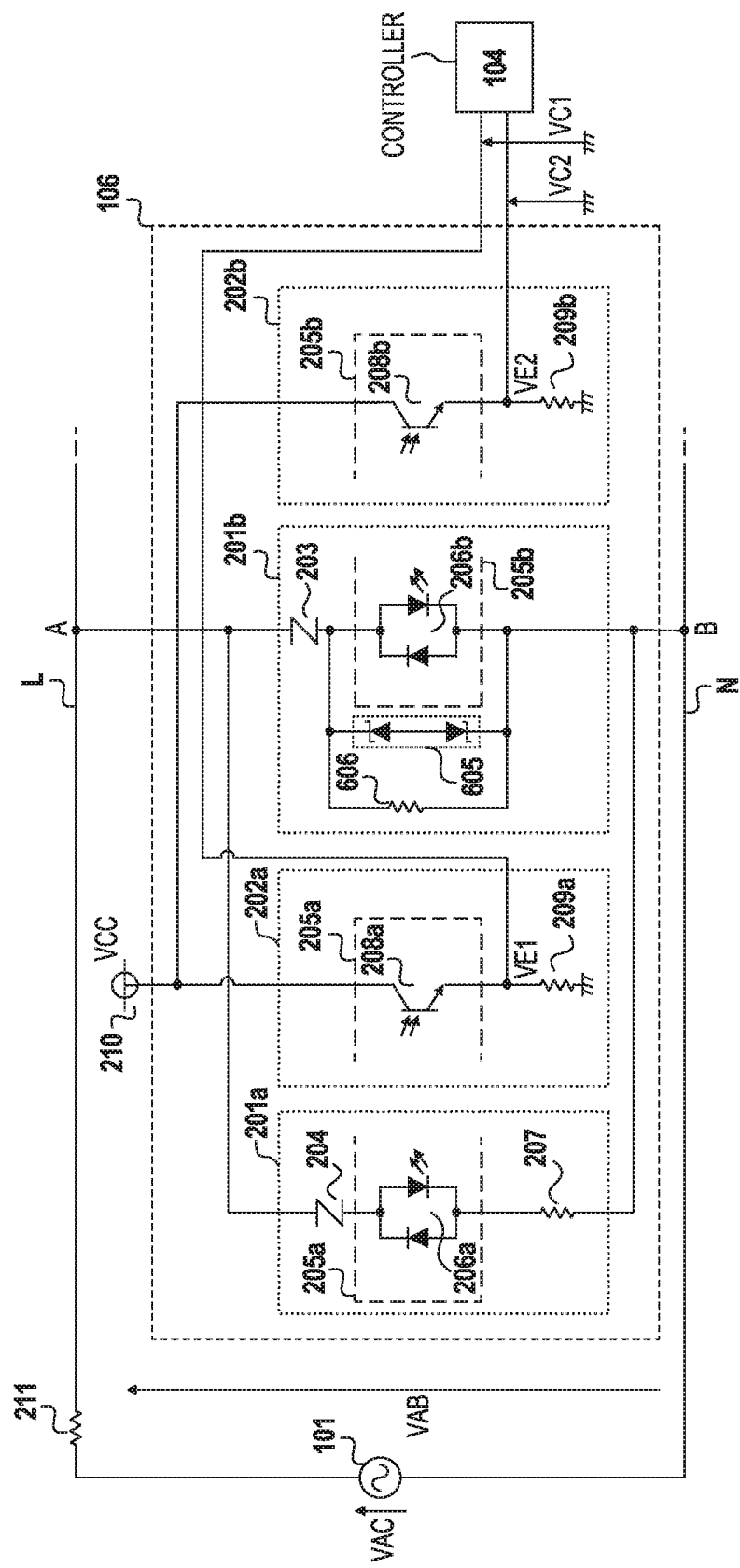
FIG. 6 is a circuit diagram showing a surge detection apparatus.

In comparison to the surge detection circuit 106 of the first embodiment, a surge detection circuit 201b and a surge reporting circuit 202b are added to the surge detection circuit 106 of the second embodiment which is shown in FIG. 6. When the surge detection circuit 201b detects a surge voltage greater than or equal to the second operating voltage V2, the surge reporting circuit 202b outputs a detection signal VE2 to the controller 104. Thus the controller 104 can recognize that a surge voltage greater than or equal to the second operating voltage V2 has occurred. That is, the controller 104 can distinguish between a large surge voltage and a small surge voltage. In the second embodiment, the same reference numerals are assigned to the same parts as those in the first embodiment, and the description thereof is omitted.

The surge detection circuit 201b is connected between the live line L and the neutral line N. That is, the surge detection circuit 201b is connected in parallel with respect to the surge detection circuit 201a. The surge detection circuit 201b has a surge absorbing element 203, a light emitting unit 206b of a photocoupler 205b, a Zener diode pair 605, and a resistor 606. One end of the surge absorbing element 203 is connected to the connection point A. The other end of the surge absorbing element 203 is connected to one end of the resistor 606, one end of the Zener diode pair 605, and one end of the light emitting unit 206b. The light emitting unit 206b, a Zener diode pair 605, and the resistor 606 are connected in parallel. The Zener diode pair 605 is obtained by connecting a first Zener diode and a second Zener diode in series. In particular, the anode of the second Zener diode is connected to the anode of the first Zener diode. The other end of the resistor 606, the other end of the Zener diode pair 605, and the other end of the light emitting unit 206b are connected to the connection point B. The light emitting unit 206b is also configured by two light emitting elements which are also connected in inverse parallel in a similar manner to with the light emitting unit 206a.

When a surge voltage exceeding the second operating voltage V2 of the surge absorbing element 203 is applied to the commercial power supply 101, the resistance value of the surge absorbing element 203 becomes a low resistance value, and a surge current should flow into the light emitting unit 206b. When a large surge current flows to the light emitting unit 206b, the light emitting unit 206b will fail. Therefore, Zener diode pair 605 and the resistor 606 are provided to protect the light emitting unit 206b of the photocoupler 205b from the surge current.

In the second embodiment, the light emitting unit 206b is formed by two light emitting elements which are connected in inverse parallel. However, the light emitting unit 206b may be realized by an inverse parallel connection of two photocouplers that use one light emitting element.

The surge reporting circuit 202b has a light receiving unit 208b and a resistor 209b of the photocoupler 205b which are connected in series. The resistor 209b functions as a pull-down resistor. Power is supplied to the light receiving unit 208b from the external power supply 210. The light receiving unit 208b can be realized by, for example, a phototransistor, a triac, or a MOSFET. Here, a phototransistor is employed in the light receiving unit 208b. The external power supply 210 is connected to the collector of the light receiving unit 208b. One end of the resistor 209b is connected to the emitter of the light receiving unit 208b. The other end of the resistor 209b is connected to earth. The emitter of the light receiving unit 208b is connected to an input port of the controller 104. In the present embodiment, the photocoupler 205b may also be replaced with a current transformer in a similar manner to as with the photocoupler 205a. When the surge detection circuit 201b detects a surge voltage that is greater than or equal to V2, the surge reporting circuit 202*b* outputs a high-level surge detection signal VE2 to the controller 104. If the surge detection circuit 201*b* does not detect a surge voltage that is greater than or equal to V2, the surge reporting circuit 202*b* outputs a low-level surge detection signal VE2 to the controller 104. This is because when the light receiving unit 208*b* is turned off, the voltage VC2 applied to the input port becomes 0 [V] in accordance with the resistor 209*b*.

<Operation of Surge Detection Apparatus>

Figure 7:
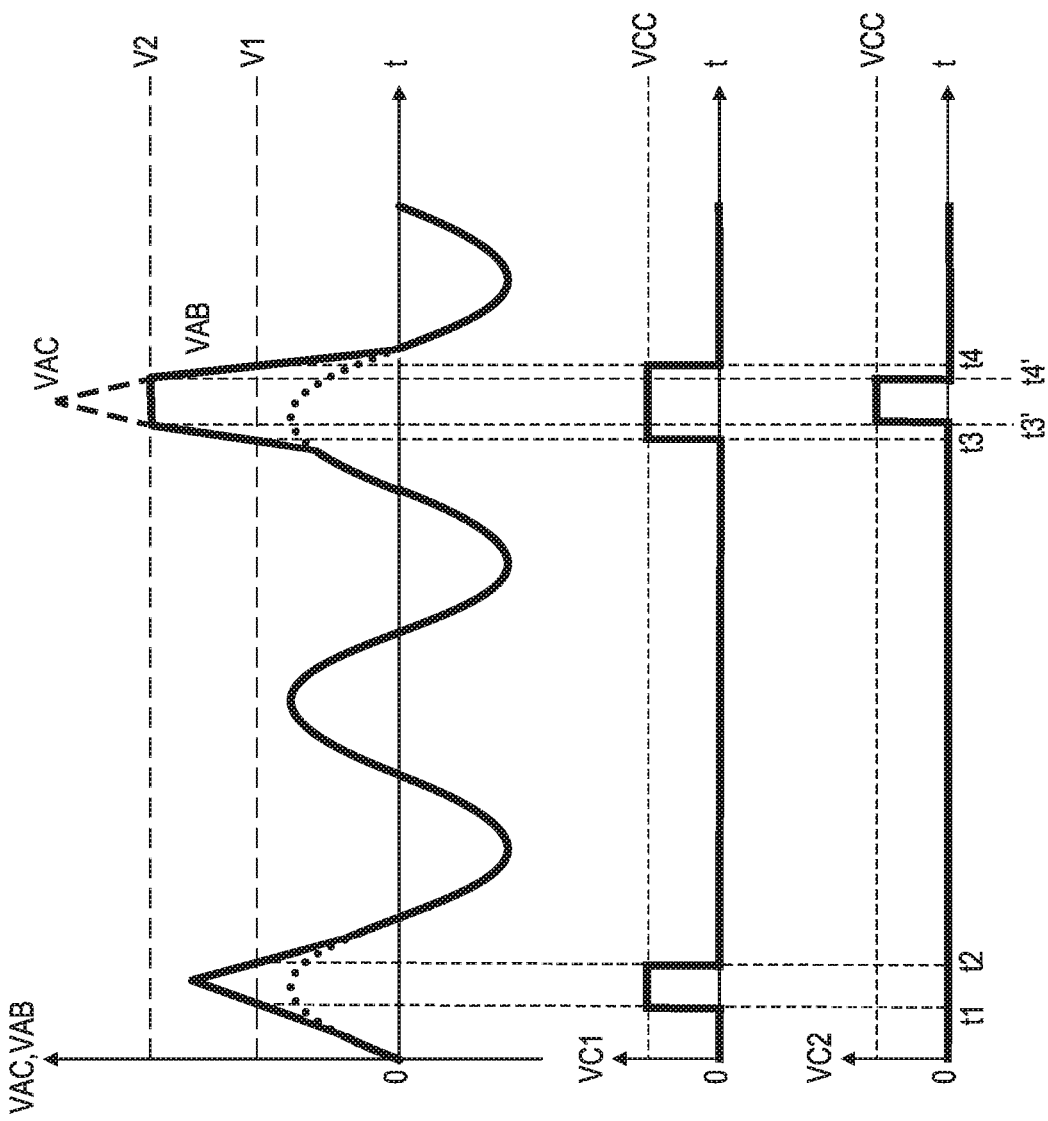
FIG. 7A to FIG. 7C are views for describing surge voltages and detection signals.

FIG. 7A shows the variation of a voltage VAC of the commercial power supply 101. The vertical axis indicates voltage. The horizontal axis indicates time. The end-to-end voltage across the surge detection circuit 106 is VAB. The dotted line indicates the waveform of the voltage VAC when no surge voltage is occurring. FIG. 7B shows a voltage VC1 applied to an input port of the controller 104. The vertical axis indicates voltage. FIG. 7C shows a voltage VC2 applied to an input port of the controller 104. The vertical axis indicates voltage. Hereinafter, the operation of the surge detection circuit 106 will be described for each of a first time period (0<t<t1), a second time period (t1≤t≤t2), a third time period (t2<t<t3), and a fourth time period (t3≤t≤t4).

First Time Period [0<t<t1]

In the first time period, the voltage VAC of the commercial power supply 101 is less than the first operating voltage V1 and the second operating voltage V2. In other words, in the first time period, no surge voltage has occurred. Therefore, both the level of the surge detection signal VE1 and the level of the surge detection signal VE2 are the low level.

Second Time Period [t1≤t≤t2]

In the second time period as shown in FIG. 7A, a surge voltage that is greater than or equal to the first operating voltage V1 and less than the second operating voltage V2 has occurred. In the second time period, the level of the surge detection signal VE1 becomes High, but the level of the surge detection signal VE2 stays at the low level.

Third Time Period [t2<t<t3]

In the third time period, the voltage VAC of the commercial power supply 101 is less than the first operating voltage V1 and the second operating voltage V2. In other words, in the third time period, no surge voltage has occurred. Therefore, both the level of the surge detection signal VE1 and the level of the surge detection signal VE2 are the low level.

Fourth Time Period [t3≤t≤t4]

In the fourth time period, a surge voltage exceeding the first operating voltage V1 has occurred. Therefore, the level of the surge detection signal VE2 becomes the High level. Furthermore, in the time period from time t3' to time t4', the surge voltage has become greater than or equal to the second operating voltage V2. Therefore, the level of the surge detection signal VE2 also becomes the High level. In the time period from time t3' to time t4', the surge absorbing element 203 absorbs the surge voltage, and the voltage applied to the surge absorbing element 203 is clamped at the second operating voltage V2. Therefore, the end-to-end voltage VAB is kept at the second operating voltage V2.

In a time period where the voltage VAC is greater than or equal to the second operating voltage V2, the resistance value of the surge absorbing element 203 is a low resistance value. As a result, a surge current ISURGE flows through a route formed by the commercial power supply 101, the line impedance 211, and the surge detection circuit 201*b*. The surge current ISURGE flows so that the end-to-end voltage VAB across the surge detection circuit 106 is equal to the second operating voltage V2. Therefore, the above Equation (2) holds.

In this way, by surge absorbing element 203 operating, the end-to-end voltage VAB of the surge detection circuit 106 is limited to the second operating voltage V2. As a result, the ADC 105, which is present subsequent to the surge detection circuit 106, can be protected from an external surge. When the light emitting unit 206*b* is turned on in accordance with the surge current, the light receiving unit 208*b* receives the light outputted from the light emitting unit 206*b*. By this, the level of the surge detection signal VE2 becomes High. When the level of the surge detection signal VE2 becomes High, the controller 104 recognizes that an external surge is applied to the commercial power supply 101, and the voltage VAC has become greater than or equal to the second operating voltage V2.

In the first embodiment, a warning is output when a number of occurrences X of the surge voltage satisfies a predetermined warning condition. In the second embodiment, a warning is output when a number of occurrences Y of large surge voltages and a number of occurrences Z of small surge voltages satisfy a predetermined warning condition.

Figure 8:
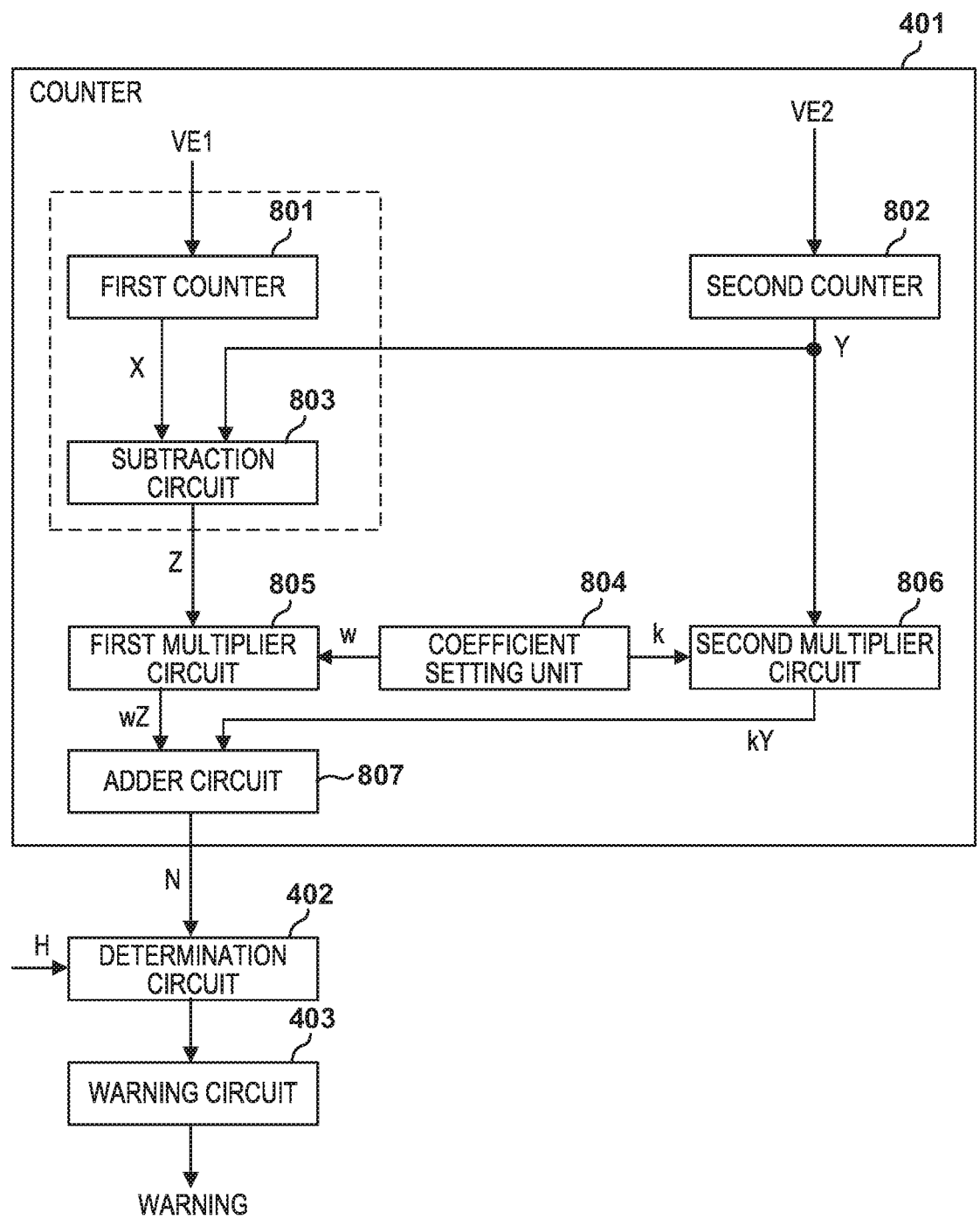
FIG. 8 is a view for describing a controller.

FIG. 8 shows the functions of the controller 104 in the second embodiment. The same reference numerals are given to the functions already described above. In particular, the counter 401 is configured to count the number of occurrences Y of large surge voltages and the number of occurrences Z of small surge voltages.

A first counter 801 counts the number of times X that the surge detection signal VE1 becomes the high level. Incidentally, the surge detection signal VE1 becomes High when the voltage VAC that includes a surge voltage becomes greater than or equal to the first operating voltage V1, and when the voltage VAC becomes greater than or equal to the second operating voltage V2. Therefore, the number of times X is the sum of the number of occurrences Y of large surge voltages and the number of occurrences Z of small surge voltages. A second counter 802 counts the number of times Y that the surge detection signal VE2 becomes the high level. A subtraction circuit 803 is a circuit for calculating the number of occurrences of small surge voltages, and obtains the number of occurrences Z by subtracting the number Y from the number X. A coefficient setting unit 804 is a circuit for setting a weighting coefficient w which is to be multiplied by the number Z to a first multiplier circuit 805, and setting a weighting coefficient k which is to be multiplied by the number Y to a second multiplier circuit 806. Note that k is larger than w. This is because larger surge voltages have a greater impact on the semiconductor elements of the power supply apparatus 102 than smaller surge voltages. The first multiplier circuit 805 multiplies the number of occurrences Z by the weighting coefficient w, and outputs wZ which is the product to an adder circuit 807. The second multiplier circuit 806 multiplies the number Y by the weighting coefficient k, and outputs kY which is the product to the adder circuit 807. The adder circuit 807 obtains a sum N of wZ and kY, and outputs it to the determination circuit 402. If the sum N is greater than or equal to the threshold H, the determination circuit 402 outputs a high-level determination signal to the warning circuit 403. If the sum N is less than the threshold H, the determination circuit 402 outputs a low-level determination signal to the warning circuit 403. Operation of the warning circuit 403 is as described in the first embodiment.

<Flow Chart>

Figure 9:
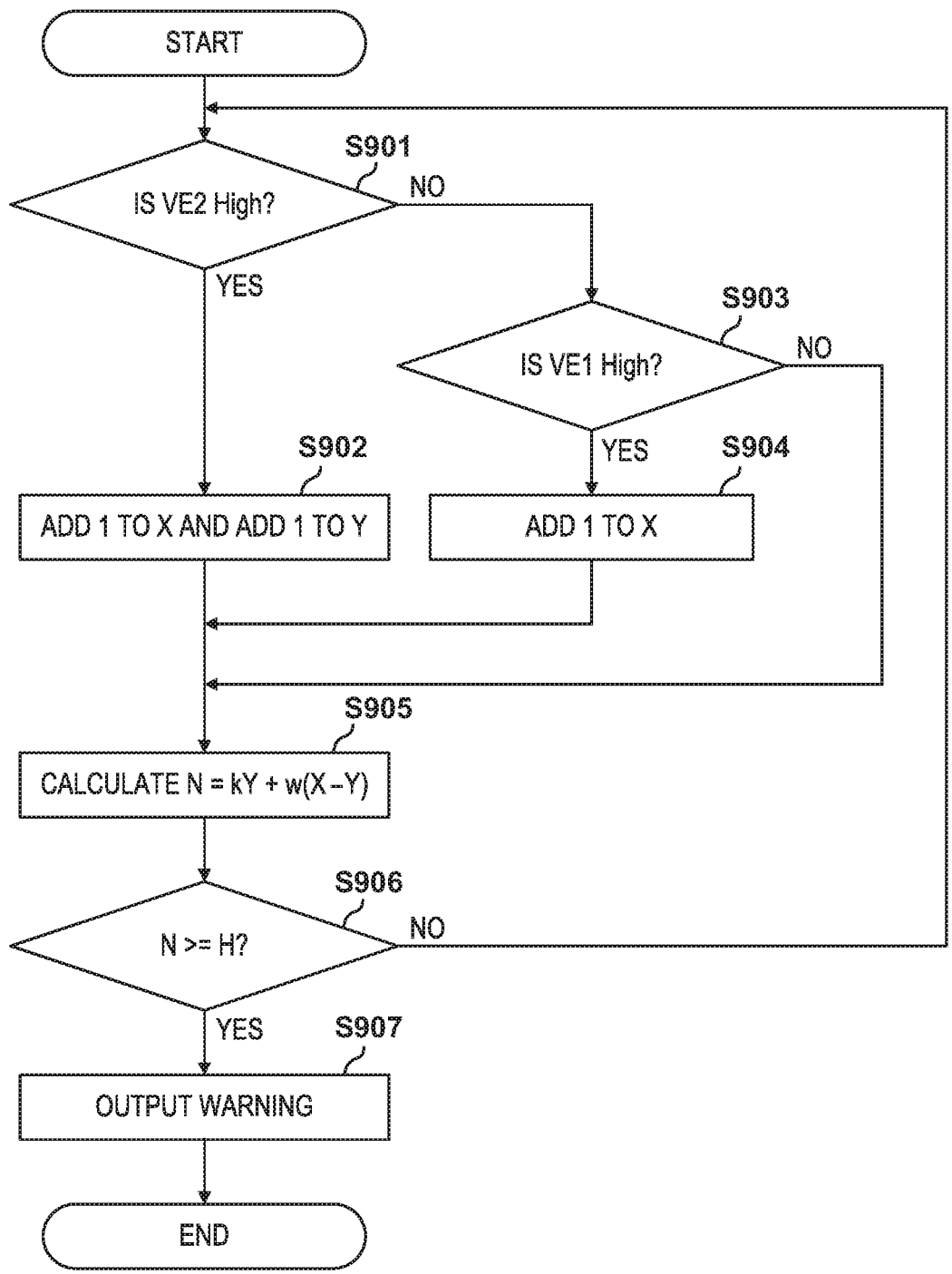
FIG. 9 is a flowchart for illustrating a surge detection method.

FIG. 9 is a flow chart showing a control method executed by the CPU 410 of the controller 104. Here, it is assumed that the functions shown in FIG. 8 are realized by the CPU 410 shown in FIG. 4B.

In step S901, the CPU 410 determines whether the level of the surge detection signal VE2 is High. If the level of the surge detection signal VE2 is High, the CPU 410 advances the processing to step S902. If the level of the surge detection signal VE2 is not High, the CPU 410 advances the processing to step S903.

In step S902, the CPU 410 adds 1 to the number X held in the memory 420, and also adds 1 to the number Y. The CPU 410 then advances the processing to step S905.

In step S903, the CPU 410 determines whether the level of the surge detection signal VE1 is High. If the level of the surge detection signal VE1 is High, the CPU 410 advances the processing to step S904. If the level of the surge detection signal VE1 is not High, the CPU 410 advances the processing to step S905.

In step S904, the CPU 410 adds 1 to the number X held in the memory 420.

In step S905, the CPU 410 multiplies the number Y by the weighting coefficient k held in the memory 420 to calculate the product kY, and multiplies a difference (X−Y) by the weighting coefficient w to calculate the product w(X−Y). X−Y is Z as described above. Further, the CPU 410 adds together the product kY and the product w(X−Y) to calculate the sum N.

In step S906, the CPU 410 determines whether the sum N is greater than or equal to the threshold H. The threshold H is the number of times at which the replacement of the power supply circuit is recommended, and is obtained in advance by simulation or experiment. If the sum N is greater than or equal to the threshold H, the CPU 410 advances the processing to step S907. If the sum N is less than the threshold H, the CPU 410 advances the processing to step S901.

In step S907, the CPU 410 outputs a warning. For example, the CPU 410 may cause the display device 108 to display a warning message. The CPU 410 may control the communication circuit 109 to cause a warning message to be transmitted to a predetermined network address. The warning message includes a message that prompts replacement of the power supply apparatus 102. When the power supply apparatus 102 is replaced, the values of the numbers X and Y are each initialized to 0.

<Supplement>

Figure 10:
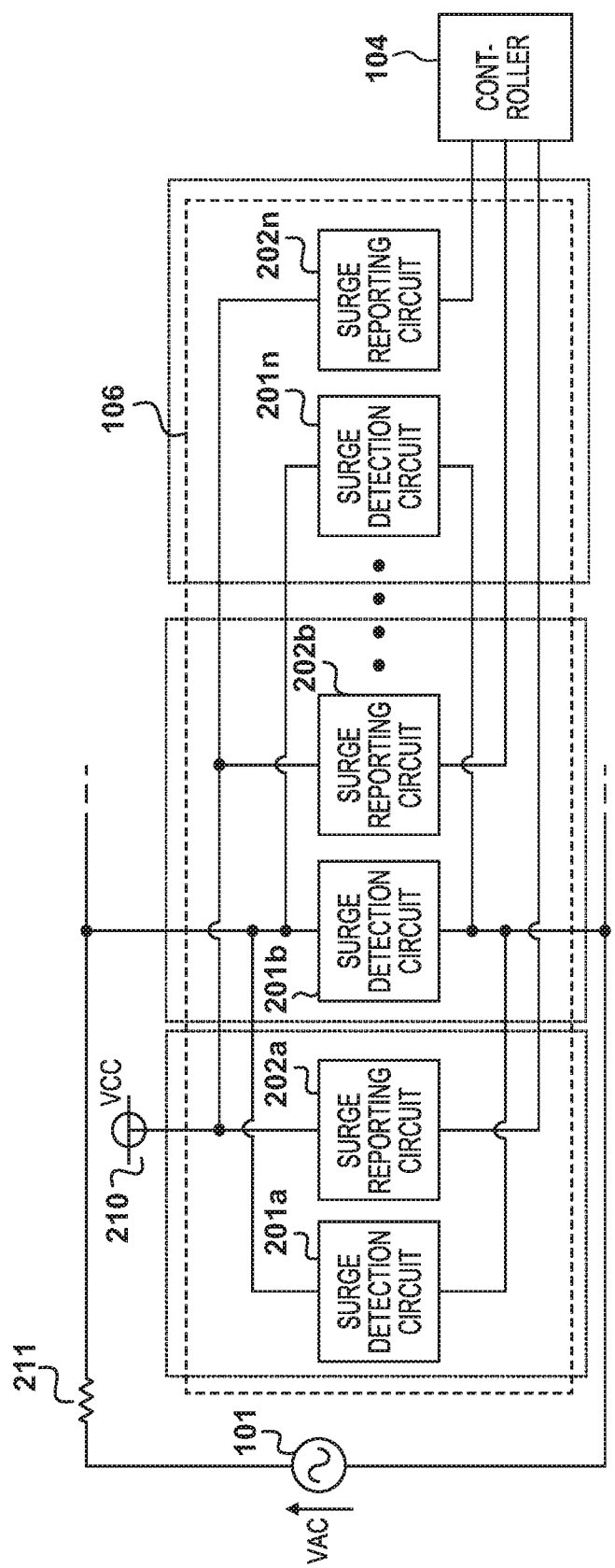
FIG. 10 is a view showing a surge detection apparatus.

In the first embodiment, a relatively small surge voltage is detected by a pair consisting of the surge detection circuit 201a and the surge reporting circuit 202a. In the second embodiment, two types of surge voltages are detected by a pair consisting of a surge detection circuit 201a and a surge reporting circuit 202a and a pair consisting of a surge detection circuit 201b and a surge reporting circuit 202b. As shown in FIG. 10, the number of pairs of a surge detection circuit 201 and a surge reporting circuit 202 may be three or more. In this case, by varying the operating voltage of the surge absorbing element included in each surge detection circuit 201, it is possible to detect more types of surge voltages. It is assumed that these three or more pairs are connected in parallel. The Nth pair of the N pairs in FIG. 10 is formed by a surge detection circuit 201n and a surge reporting circuit 202n. N is an integer greater than or equal to 3.

For example, it is assumed that four pairs of a surge detection circuit 201 and a surge reporting circuit 202 are connected in parallel. The four pairs of operating voltages are a first operating voltage V1, a second operating voltage V2, a third operating voltage V3, and a fourth operating voltage V4, respectively. Further, V1<V2<V3<V4 is established. In this case, the controller 104 can recognize four kinds of voltage levels such as the following:

Level 1: greater than or equal to the first operating voltage V1 and less than the second operating voltage V2;

Level 2: greater than or equal to the second operating voltage V2 and less than the third operating voltage V3;

Level 3: greater than or equal to the third operating voltage V3 and less than the fourth operating voltage V4; and Level 4: greater than or equal to the fourth operating voltage V4.

As described in the second embodiment, the sum N may be obtained by performing different weighting for each detection level. As in the second embodiment, a weighting coefficient which is multiplied by the number of detections of a large level surge voltage is relatively large. In addition, the CPU 410 may hold the number of occurrences of surge voltages for each of the levels in a nonvolatile storage area of the memory 420. By this it should be possible to analyze the levels of the surge voltages and the number of occurrences per level.

FIG. 11 shows an image forming apparatus which is an example of the electronic device 100. An image forming engine 120 includes a charging device 123 that uniformly charges a photosensitive member 122. An exposure apparatus 140 illuminates the photosensitive member 122 with laser light according to an image signal to form an electrostatic latent image. A developing device 121 develops an electrostatic latent image using toner to form a toner image. The controller 104 controls a load 103, such as a motor, to cause the photosensitive member 122 or the like to rotate. Thereby, the toner image is conveyed to a transfer roller 128. Further, the controller 104 controls the load 103 such as a motor, to drive a feeding roller 151, and conveyance roller pairs 152a, 152b, and 152c. Thereby, a sheet P is conveyed to the transfer roller 128. The transfer roller 128 transfers the toner image onto the sheet P. A fixing device 130 applies heat and pressure to the toner image and the sheet P, thereby fixing the toner image to the sheet P. Discharge rollers 153 discharge the sheet P to a tray 111. Since the power supply apparatus 102 and controller 104 described above are employed, the downtime of the image forming apparatus is reduced.

Technical Concept Derived from Embodiments

The ADC 105 as shown in FIG. 1 is an example of a power supply circuit connectable to two power supply lines from an AC power supply (e.g., hot line and neutral line). The surge absorbing element 203 functions as a protection circuit for protecting the power supply circuit by reducing surge voltages applied to the two power supply lines. The surge detection circuit 201a is connected in parallel with respect to the protection circuit, and is an example of a first detection circuit for detecting a surge voltage.

As shown in FIG. 2 or the like, the surge detection circuit 106 may have a first surge absorbing circuit (for example, the surge absorbing element 204) and a detection circuit (for example, the photocoupler 205a). For the first surge absorbing circuit, its resistance value is reduced when the surge voltage is greater than or equal to the first operating voltage, and its resistance value is increased when the surge voltage is not greater than or equal to the first operating voltage. That is, the first surge absorbing circuit becomes a low resistance when a surge voltage greater than or equal to the first operating voltage is applied to the two power supply lines, and becomes a high resistance when a surge voltage greater than or equal to the first operating voltage is not applied to the two power supply lines. Here, the surge voltage is a voltage surge component that is added to the voltage supplied from the commercial power supply 101. The photocoupler 205a is configured to output a detection signal indicating that the surge voltage is greater than or equal to the first operating voltage when the surge voltage is greater than or equal to the first operating voltage. The protection circuit may include a second surge absorbing circuit (e.g., the surge absorbing element 203). For the second surge absorbing circuit, its resistance value is reduced when the surge voltage is greater than or equal to a second operating voltage that is greater than the first operating voltage, and its resistance value is increased when the surge voltage is not greater than or equal to the second operating voltage. In other words, the second surge absorbing circuit becomes a low resistance when a surge voltage greater than or equal to the second operating voltage which is bigger than the first operating voltage is applied to the two power supply lines, and becomes a high resistance when a surge voltage greater than or equal to the second operating voltage is not applied. By virtue of the present embodiment as described above, the second surge absorbing circuit protects the power supply circuit from a large surge voltage, and the detection circuit detects a small surge voltage. In other words, it is possible to detect a small surge voltage while protecting the power supply circuit from a large surge voltage.

As shown in FIG. 2 and the like, the resistor 207 functions as a current limiting circuit to limit a surge current due to a surge voltage from flowing into the first detection circuit. Between the two power supply lines, the first surge absorbing circuit, the detection circuit (e.g., the light emitting unit 206a), and the current limiting circuit may be connected in series. Thus, the detection circuit is protected from the surge current.

As shown by Equation (1), the resistance value of the current limiting circuit is larger than a quotient obtained by dividing the difference between the second operating voltage and the first operating voltage by the rated current of the primary side of the detection circuit. Thus, the detection circuit should be suitably protected from the surge current.

The detection circuit may be a photocoupler or a current transformer. Accordingly, it is possible to insulate a primary side circuit to which the surge voltage is applied from a secondary side circuit where the controller 104 or the like is present.

The first surge absorbing circuit (e.g., the surge absorbing element 204) may be a varistor. Varistors are readily available on the market. Therefore, by employing a varistor as the first surge absorbing circuit, it should be easy to realize the present invention.

The second surge absorbing circuit (e.g., the surge absorbing element 203) may be a varistor. Varistors are readily available on the market. Therefore, by employing a varistor as the second surge absorbing circuit, it should be easy to realize the present invention.

As shown by FIG. 6 and the like, configuration may be taken to have a second detection circuit (e.g., the photocoupler 205b) that is connected in parallel to the protection circuit and is for outputting a detection signal upon detecting a surge voltage greater than or equal to the second operating voltage. By this, the controller 104 should be able to distinguish between a large surge voltage and a small surge voltage.

The second detection circuit (e.g., light emitting unit 206b of the photocoupler 205b) may be connected in series with respect to the second surge absorbing circuit between the two power supply lines. Thus, when a surge voltage greater than V2 which is the operating voltage of the second surge absorbing circuit is applied, a surge current will flow through the second detection circuit. That is, the second detection circuit may generate a surge detection signal VE2 when the surge current flows.

The resistor 606 and the Zener diode pair 605 are connected in parallel with respect to the second detection circuit, and function as a protection circuit for protecting the second detection circuit from a surge current which occurs due to a surge voltage that is greater than or equal to the second operating voltage. By this, it is easier to protect the second detection circuit (e.g., the light emitting unit 206b of the photocoupler 205b) from a surge current.

The protection circuit may have a current limiting element (e.g., the resistor 606) connected in parallel with respect to the second detection circuit, and two Zener diodes (e.g., the Zener diode pair 605) that are connected in parallel with respect to the second detection circuit. As shown in FIG. 6, of the two Zener diodes connected in series with each other, the anode of the second diode is connected to the anode of the first diode. With this, the second detection circuit is protected regardless of the polarity of a surge voltage.

The second detection circuit may be a photocoupler or a current transformer. Accordingly, it is possible to insulate a primary side circuit to which the surge voltage is applied from a secondary side circuit where the controller 104 or the like is present.

The CPU 410 or the counter 401 function as a count circuit for counting the number of times a detection signal is outputted from the detection circuit. The CPU 410 is one example of at least one processor that implements various functions. The CPU 410 or the determination circuit 402 may function as a determination circuit for determining whether the number of times counted by the count circuit is equal to or greater than a threshold value. The CPU 410 or the warning circuit 403 may function as a warning circuit for outputting a warning when the number of times counted by the count circuit is equal to or greater than the threshold value. By this it should be easier for a user to be aware of the occurrence of a surge.

As shown in FIG. 8, the CPU 410 or the first counter 801 and the subtraction circuit 803 may function as a first count circuit for counting the number of times a detection signal is output from the detection circuit. The CPU 410 or the second counter 802 may function as a second count circuit for counting the number of times a detection signal is outputted from the second detection circuit. The CPU 410 or the determination circuit 402 and the warning circuit 403 may function as a warning circuit for outputting a warning when the count value of the first count circuit and the count value of the second count circuit satisfy a predetermined warning condition.

The CPU 410 or the first multiplier circuit 805 may function as a first multiplier circuit for obtaining a first product by multiplying the count value of the first count circuit by a first weighting coefficient. The CPU 410 or the second multiplier circuit 806 may function as a second multiplier circuit for obtaining a second product by multiplying by the count value of the second count circuit by a second weighting coefficient that is larger than the first weighting coefficient. The CPU 410 or the adder circuit 807 may function as an adder circuit for calculating a sum of the first product and the second product. The CPU 410 or the determination circuit 402 may function as a determination circuit for determining whether the sum of the first product and the second product is equal to or greater than the threshold value. The predetermined warning condition may be the sum of the first product and the second product being equal to or greater than the threshold value. By this, a warning considering both small surge voltages and large surge voltages will be outputted.

The warning may include information prompting replacement of the power supply circuit or information indicating that a plurality of surge voltages have been applied to the power supply circuit. This should mean that an old power supply circuit will be replaced with a new power supply circuit before the old power supply circuit fails. As a result, downtime for the power supply apparatus and the electronic device will be reduced.

The warning circuit may include a display circuit (e.g., the display device 108) for displaying a warning. By this, a user should be able to visually understand the warning.

The warning circuit may include a transmission circuit (e.g., the communication circuit 109) that transmits a warning to a predetermined network address. This makes it easier for users and administrators at remote locations to notice warnings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-125464 filed Jul. 4, 2019 which is hereby incorporated by reference herein in its entirety.

What is claimed is:

1. A power supply apparatus comprising:
   a power supply circuit connectable to a power supply line from an AC power supply;
   a protection circuit configured to protect the power supply circuit by reducing a surge voltage applied to the power supply line; and
   a first detection circuit that is connected in parallel to the protection circuit and is configured to detect the surge voltage,
   wherein the first detection circuit includes
   a first surge absorbing circuit configured to become a low resistance in a case where the surge voltage which is greater than or equal to a first operating voltage is applied to the power supply line, and become a high resistance in a case where the surge voltage which is greater than or equal to the first operating voltage is not applied to the power supply line, and
   a detection circuit configured to output a detection signal indicating that the surge voltage detected by the first detection circuit is greater than or equal to the first operating voltage in a case where the surge voltage is greater than or equal to the first operating voltage, and
   the protection circuit includes
   a second surge absorbing circuit configured to become a low resistance in a case where the surge voltage greater than or equal to a second operating voltage which is larger than the first operating voltage is applied to the power supply line, and become a high resistance in a case where the surge voltage greater than or equal to the second operating voltage is not applied to the power supply line.

2. The power supply apparatus according to claim 1, further comprising:
   a current limiting circuit configured to limit a surge current, which is due to the surge voltage, flowing into the first detection circuit,
   wherein the first surge absorbing circuit, the detection circuit, and the current limiting circuit are connected in series between a hot line and a neutral line of the power supply line.

3. The power supply apparatus according to claim 2, wherein
   a resistance value of the current limiting circuit is larger than a quotient obtained by dividing the difference between the second operating voltage and the first operating voltage by a rated current of a primary side of the detection circuit.

4. The power supply apparatus according to claim 1, wherein
   the detection circuit includes a photocoupler or a current transformer.

5. The power supply apparatus according to claim 1, wherein
   the first surge absorbing circuit includes a first varistor.

6. The power supply apparatus according to claim 1, wherein
   the second surge absorbing circuit includes a second varistor.

7. The power supply apparatus according to claim 1, further comprising
   a second detection circuit configured to output a detection signal upon detecting the surge voltage greater than or equal to the second operating voltage.

8. The power supply apparatus according to claim 7, wherein
the second detection circuit is connected in series with the second surge absorbing circuit between a hot line and a neutral line of the power supply line.

9. The power supply apparatus according to claim 7, further comprising
a second protection circuit connected in parallel to the second detection circuit, and configured to protect the second detection circuit from a surge current that occurs due to the surge voltage greater than or equal to the second operating voltage.

10. The power supply apparatus according to claim 9, wherein
the second protection circuit has
a current limiting element connected in parallel with respect to the second detection circuit,
a first Zener diode connected in parallel with respect to the second detection circuit, and
a second Zener diode connected in series with the first Zener diode,
wherein, an anode of the second Zener diode is connected to an anode of the first Zener diode.

11. The power supply apparatus according to claim 7, wherein
the second detection circuit includes a photocoupler or a current transformer.

12. The power supply apparatus according to claim 1, further comprising
at least one processor having following functions:
a count function for counting a number of times the detection signal is outputted from the detection circuit;
a determination function for determining whether or not the number of times counted by the count function is greater than or equal to a threshold; and
a warning function for outputting warning that the number of times counted by the count function is greater than or equal to a threshold value.

13. The power supply apparatus according to claim 1, further comprising
at least one processor configured to perform following functions:
counting a number of times the detection signal is outputted from the detection circuit;
counting a number of times the detection signal is outputted from the second detection circuit;
outputting a warning in a case where a count value in accordance with the first count function and a count value in accordance with the second count function satisfy a predetermined warning condition.

14. The power supply apparatus according to claim 13, wherein
the at least one processor further performs following functions:
performing a first multiplication for obtaining a first product by multiplying the count value in accordance with the first count function by a first weighting coefficient;
performing a second multiplication for obtaining a second product by multiplying the count value in accordance with the second count function by a second weighting coefficient greater than the first weighting coefficient; and
performing addition to obtain a sum of the first product and the second product, and
determining whether the sum of the first product and the second product is greater than or equal to a threshold, wherein the predetermined warning condition is the sum of the first product and the second product being greater than or equal to the threshold.

15. The power supply apparatus according to claim 12, wherein
the warning includes information prompting replacement of the power supply circuit or information indicating that a plurality of surge voltages have been applied to the power supply circuit.

16. The power supply apparatus according to claim 15, further comprising
a display device configured to display the warning.

17. The power supply apparatus according to claim 15, further comprising
a transmission circuit configured to transmit the warning to a predetermined network address.

18. A surge detecting apparatus comprising:
a protection circuit configured to protect a load connected to a power supply line by reducing a surge voltage applied to the power supply line from an AC power supply; and
the first detection circuit that is connected in parallel to the protection circuit and is configured to detect the surge voltage,
wherein the first detection circuit includes
a first surge absorbing circuit configured to become a low resistance in a case where the surge voltage which is greater than or equal to a first operating voltage is applied to the power supply line, and become a high resistance in a case where the surge voltage which is greater than or equal to the first operating voltage is not applied to the power supply line, and
a detection circuit configured to output a detection signal indicating that the surge voltage detected by the first detection circuit is greater than or equal to the first operating voltage in a case where the surge voltage is greater than or equal to the first operating voltage, and
the protection circuit includes
a second surge absorbing circuit configured to become a low resistance in a case where a surge voltage greater than or equal to a second operating voltage which is larger than the first operating voltage is applied to the power supply line, and configured to become a high resistance in a case where a surge voltage greater than or equal to the second operating voltage is not applied to the power supply line.

19. An electronics device comprising
a power supply,
wherein the power supply comprises:
a power supply circuit connectable to a power supply line from an AC power supply;
a protection circuit configured to protect the power supply circuit by reducing a surge voltage applied to the power supply line; and
the first detection circuit that is connected in parallel to the protection circuit and is configured to detect the surge voltage,
wherein the first detection circuit includes
a first surge absorbing circuit configured to become a low resistance in a case where the surge voltage which is greater than or equal to a first operating voltage is applied to the power supply line, and become a high resistance in a case where the surge voltage which is greater than or equal to the first operating voltage is not applied to the power supply line, and
a detection circuit configured to output a detection signal indicating that the surge voltage detected by the first detection circuit is greater than or equal to the first operating voltage in a case where the surge voltage is greater than or equal to the first operating voltage, and the protection circuit includes a second surge absorbing circuit configured to become a low resistance in a case where the surge voltage greater than or equal to a second operating voltage which is larger than the first operating voltage is applied to the power supply line, and become a high resistance in a case where the surge voltage greater than or equal to the second operating voltage is not applied to the power supply line.

* * * * *